United States Patent [19]

Gockley et al.

[11] Patent Number: 4,660,611
[45] Date of Patent: Apr. 28, 1987

[54] TIRE CHAIN

[75] Inventors: Glenn E. Gockley; Michael D. Shaffer, both of York, Pa.

[73] Assignee: Cooper Industries, Houston, Tex.

[21] Appl. No.: 761,212

[22] Filed: Jul. 31, 1985

[51] Int. Cl.[4] ............... B60C 27/06; B21L 3/00; F16G 13/00

[52] U.S. Cl. .................................. 152/243; 59/3; 59/31; 59/35.1; 59/83; 59/84; 148/16.5; 148/16.6; 148/319; 152/172; 152/189; 152/231; 228/192; 228/231

[58] Field of Search ............... 152/231, 243, 239, 242, 152/241, 240, 232, 171, 172, 177, 179, 184, 189, 245; 228/192, 231; 148/16.5, 16.6, 31.5; 59/83, 84, 3, 16–18, 22, 31, 35.1; 219/51, 52

[56] References Cited

U.S. PATENT DOCUMENTS

| | | | |
|---|---|---|---|
| 2,021,157 | 11/1935 | Stahl | 219/52 X |
| 2,562,798 | 7/1951 | Kovatch et al. | 152/242 |
| 3,144,068 | 8/1964 | Campbell, Jr. | 152/245 |
| 3,943,990 | 3/1976 | Rieger | 152/243 |

Primary Examiner—Donald Czaja
Assistant Examiner—Thomas Bokan
Attorney, Agent, or Firm—E. E. Scott; A. R. Thiele

[57] ABSTRACT

An improved passenger car tire chain employing heat treated medium carbon steel is disclosed. The improved tire chain is approximately twice as durable as that presently furnished to meet NACM-5179(TC) for Type PL chains when AISI 1026 or 1029 carbon steel is employed at least for links of a cross chain meeting the road surface. The cross chain links are closed by welding prepared abutting link ends which have been previously beveled. After being welded closed, the cross chain links are case hardened, quenched, tempered and air cooled. The improved tire chain is then assembled in a conventional manner to include a pair of side members, fastening means to secure a end of each side member to the other end, and a plurality of cross chains extending between the sidewall members at preselected intervals.

3 Claims, 3 Drawing Figures

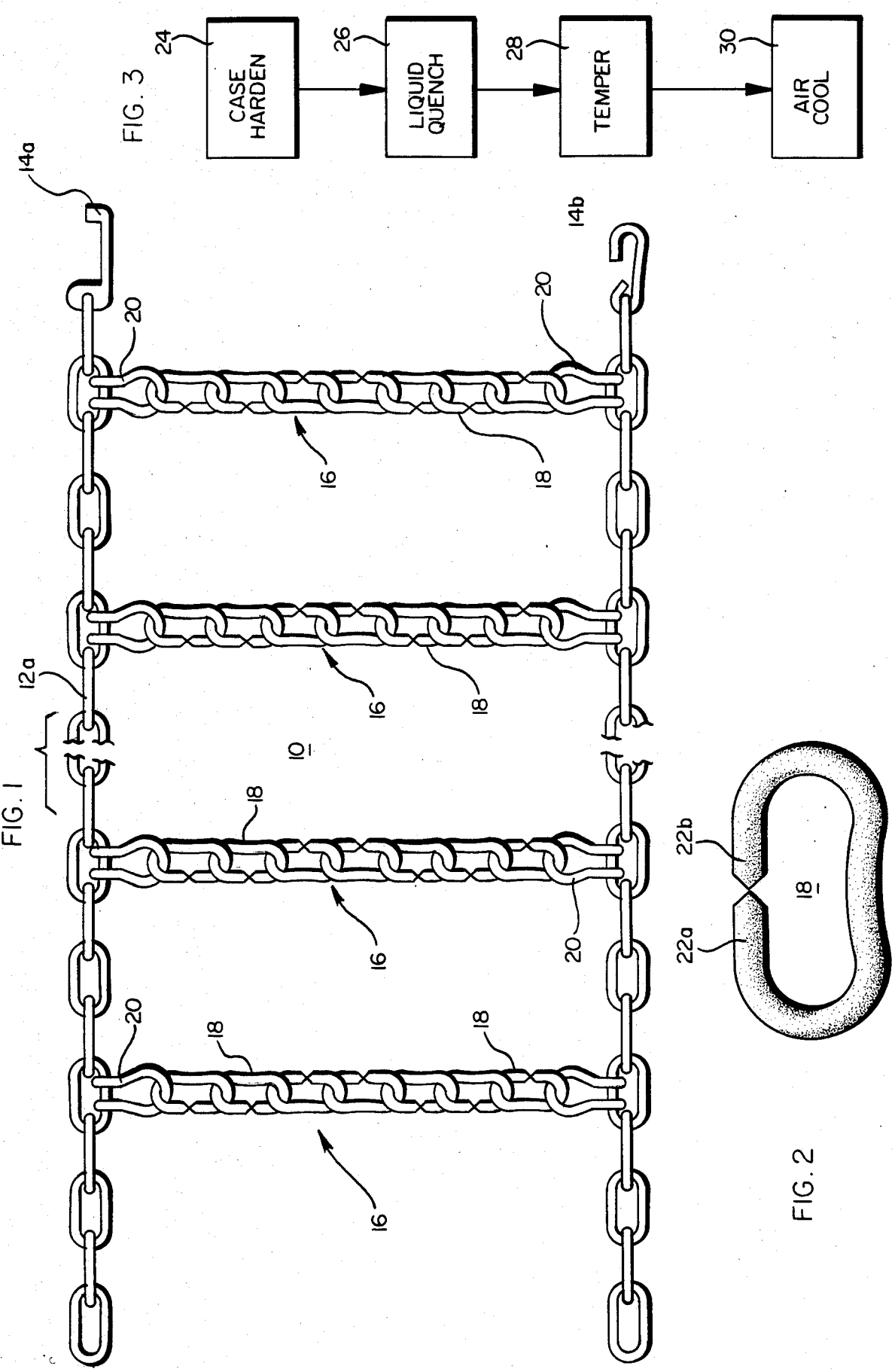

TIRE CHAIN

This invention relates to tire chains and particularly relates to tire chains manufactured from medium carbon steel suitable for use in cars.

BACKGROUND OF THE INVENTION

It is generally common knowledge that the United States car industry began to substantially reduce the size of their models in the decade of the 70's. This down sizing of cars resulted in design features which ultimately affected the use of the then conventional Type 'P' tire chain. The principal design feature affecting the use of conventionsl Type P tire chain was restricted fender clearances. As a result of the restricted clearance, some type P tire chains would impact portions of the fender areas on some cars. Neither the cars nor the tire chains benefited from the impacts. Ultimately, in 1979, the National Association of Chain Manufacturers defined a specification (NACM-5179(TC) dated May 1, 1979) defining a Type 'PL' tire chain. The Type 'PL' tire chain was specified for applications requiring SAE Class S traction devices. The Class S traction device has the most constrained dynamic profile now defined by the SAE.

To achieve this profile, which reduced the maximum extension of the tire chain from the tire center slightly more than twenty-six percent, a number of changes to the NACM standards were made. Basically, for a given tire size, the side chain length was slightly reduced, the cross chain lengths were slightly increased and the wire stock size decreased. The reduction in wire stock size of the side links was about eight percent and the cross member links were reduced about fourteen percent. The steel and heat treatment of the 'PL' links were unchanged from previous standards. Typically the industry continued to use a low carbon steel, often AISI 1008, as the link material. The links were case hardened to a depth of about $\frac{1}{4}$ to about 1/18 of the wire diameter and to a surface hardness of at least Rockwell C53.

Unfortunately, when the new Type 'PL' chains were put into service, they proved to be less durable than the traditional Type 'P' chain. When used on a traditional rear wheel drive car durability was reduced about 25%. Contemporaneously with car down sizing, domestic manufacturers increasingly turned to front wheel drive cars. The durability of Type 'PL' chains on a front wheel drive vehicle was reduced about an additional 25%.

The reduction of durability in the Type 'PL' chain to about 50% of that experienced with the conventional Type 'P' chain, in many applications, caused considerable consternation.

Extra durable chain was manufactured primarily for truck use, by at least Campbell Chain Division of Cooper Industries, the assignee of the present invention. Campbell's extra durable truck tire chain was manufactured from alloy steel, AISI 4615 or 8620, which obtained a distinctive property of durability chiefly from heat treating and from the addition of nickle or chromium rather than carbon. Normally, alloy steel was used for high strength chain in overhead lifting application and had prepared link end welds. This type alloy chain was not generally case hardened. The extra durable tire chain was case hardened, liquid quenched, and the links were closed conventionally by prepared end welding adjacent link ends. The relatively high cost of obtaining durability in a Type 'PL' tire chain by employing alloy steel of the extra durable type would result in a prohibitive price to the consumer for a car tire chain.

Butt welding links to close them is conventional in tire chain. Because butt welding can result in internal voids, or inclusions, or both, prepared end welds have often been employed in chain suitable for overhead lifting applications. Likewise tempering of either alloy or medium carbon steel has often been employed in high strength chain. Most often tempering has been employed in overhead lifting chain.

The fabrication and material of chain is dependent on the intended application envisioned for the chain. Material selection among, for example, low, medium, or high carbon steel or alloy steel is not always straight forward to obtain a given property needed in a particular application. It is believed that a number of the members of the tire chain industry independently attempted to determine an optimum ratio between case depth and stock diameter to maximize durability. The results of their investigations were inconclusive. A number believed that case depth should be deep, on the order of $\frac{1}{4}$ of wire diameter, but other believed in shallow depths, of about $\frac{1}{8}$. When the selections in the design process include commercial factors as well as choices among tempering techniques or case hardening techniques predicting the success of a design becomes so complex that empirical techniques must often be resorted to.

Although the industry was aware of the durability problem associated with conventional Type 'PL' tire chains a recognized solution was not found.

SUMMARY OF THE INVENTION

The present invention provides an improved tire chain which is considerably more durable than its forerunners. The improved tire chain is known to be about twice as durable as its forerunners when configured to meet the specification for Type 'PL' tire chain. It is believed that the present invention will markedly increase the durability of most, and probably all, tire chain regardless of the type produced.

This improved tire chain resulted from an empirical investigation attempting to determine the effect of various factors believed to affect durability. Material, case depth, surface and core hardness and welding method are now believed to be most pertinent. It is not believed that all these factors were considered together by others in a previous work.

The present invention resulted from a focus on these factors as they are relevant to a cross chain portion of a tire chain. The improved tire chain of the present invention includes a pair of side members, each of which is releasibly securable end to end by fastening means, and a plurality of cross chains secured to and extending between the side members at preselected intervals. At least the cross chain links meeting a road surface should be fabricated from a medium carbon steel, closed with a prepared end weld, and heat treated to have a somewhat hard and tough outer surface and a softer core.

The medium carbon steel preferably has constituents specified in AISI 1026. Other medium carbon steels, having similar constituents affecting durability, such as AISI 1029 steel may be used.

The cross chain links are closed by employing a prepared end weld to avoid internal voids or inclusion in the weld.

The heat treating of the formed cross chain links include the steps of case hardening, liquid quenching, tempering, and air cooling. The resulting cross chain links 18 should have a surface hardness of about 49 Rockwell C to about 57 Rockwell C with a case depth of about 1/7 to about 1/18 the wire stock diameter. Link 18 core hardness should be approximately 32 to 40 Rockwell C (AIM).

Durability of the improved tire chain is markedly adversely affected by attempting to substitute conventional materials or methods to manufacture tire chain. Low carbon steel can not be substituted for medium carbon steel. Nor can butt welds replace prepared end welds without exotic steps to avoid internal voids or inclusions. Similarly, after conventional case hardening, the cross chain links must be tempered to obtain what appears to be the required surface and core hardnesses and case depth.

DESCRIPTION OF THE DRAWING

FIG. 1 illustrates the improved tire chain of the present invention.

FIG. 2 illustrates a cross chain link shown in FIG. 1.

FIG. 3 illustrates the heat treating steps for the cross chain links of the present invention.

DETAILED DESCRIPTION OF THE INVENTION

FIG. 1 discloses the improved tire chain 10 of the present invention. Tire chain 10 includes a pair of side members 12a and 12b adapted to the mounted along the inner and outer sidewall surfaces of a tire. Fastening means 14a, 14b, adjacent first ends of side wall members 12a and 12b, respectively, are adapted to releasably secure the opposite end of their respective sidewall member. Fastening means 14a is commonly known as a CT2 fastener. Fastener 14b is commonly known as a EZ hook. Cross chains 16, including cross chain links 18 and cross chain hooks 20, extend between sidewall members 12a and 12b at preselected intervals. Cross chain hooks 20 are particularly adapted to secure an end of cross chain 16 to a sidewall member 12. Cross chain links 18 are subject to repeated impacts against the road surface in the process of enhancing tire traction under adverse circumstances. A variety of assembly methods for the components of tire chain 10 are well known in the art and will not further be described.

FIG. 2 shows a enlarged cross chain link 18. It particularly show prepared ends 22a and 22b prior to the closure of the link by welding. Preferably the prepared ends are of the configuration known as a chisel point, consisting of two generally flat opposing tapered surfaces. Links 18 are preferably formed from a medium carbon steel. Preferably the medium carbon steel includes about 0.22-0.28 percent by weight of carbon (C), about 0.60-0.90 percent by weight of manganese (Mn), up to about 0.04 percent by weight of phosphorus (P), up to about 0.05 percent by weight of sulphur (S), and the balance substantially iron, all as specified in the specification for steel categorized as AISI 1026. Other medium carbon steels having similar constituents effecting durability, such as AISI 1029 steel, may also be used.

FIG. 3 is a flow chart of the heat treating process employed to obtain the requisite properties of cross chain links 18 after they are closed by welding their prepared ends in a conventional manner. Links 18 are first case hardened 24 to increase the carbon content of the links proximate the surface of the link to a desired depth. Following removal from preferably a rotary furnace, the links 18 are quenched 26 to near ambient temperature. Following the quenching 26 of links 18, they are tempered 28 in a pit type furnace. Thereafter they are allowed to air cool to ambient temperature in step 30.

The heat treating process of FIG. 3 is selected to produce a link 18 having a relatively hard surface hardness in the range of about Rockwell C49-57 extending to a case depth in the range of about 1/7 to about 1/18 of the diameter of link 18 while having a link 18 core hardness of about Rockwell C36. The following detailed description of the process is preferred for batch lots of about 250 to 500 pieces having about 9 or 10 links 18 in each piece. It is also the preferred process for links formed from medium carbon steel having a diameter of approximately 0.177 inches. Variations in the batch size processed or the diameter of the wire stock should be compensated for. The appropriate compensation can readily be determined by those skilled in the art.

The case harden 24 step should subject links 18 to a temperature of about 1750° F. for a period of about one hour in a furnace atmosphere having a carbon potential of approximately 0.90 percent to about 1.5 percent by weight. The requisite atmosphere may be obtained by employing natural gas, or a mixture of natural gas and endothermic gas, preferably in a rotary furnace. The constituents of the endothermic gas are about 20 percent carbon monoxide (CO), 40 percent nitrogen (N), and 40 percent hydrogen (H). A mixture of natural and endothermic gas should allow closer control over the carbon potential of the atmosphere in the rotary furnace. The preferred range of the carbon potential is about 0.90-1.5 percent.

Upon completion of the case harden 24 step, links 18 are next quenched 26 in a liquid medium to approximately ambient temperature. Either an integral quench furnace or rotary furnace employing water is used.

Links 18 are next tempered 28 by subjecting them to a temperature of about 450° F. for a period of approximately two hours in a pit type furnace.

Thereafter the links are air cooled 30 to ambient temperature.

The microstructure of the link 18 can be broken down in two fundamental areas; the core and carburized case. The core is the base material (preferably AISI 1026) from which the link 18 was made. The carburized case is the surface of the link 18 with absorbed carbon from the heat treating atmosphere.

As the steel is carburized, the carbon content at or near the surface increases from the original steel level of 0.26% to an eutectiod composition in the range of 0.80-0.85% carbon for 1026 steel. When the carburized link is quenched from the carburizing temperature (1750° F.) into water (70°-90° F.) the crystal structure of its steel changes. The crystal structure of the steel core and carburized case at 1750° F. is austenite which has a face-centered cubic crystal structure.

Quenching the link 10 causes its steel to change from austenite to untempered martensite which has a body-centered tetragonal crystal structure. The carbon in the steel case and core is dissolved, or in solution, in the austenite and martensite. The carbon increases in 1026 steel from the core value of 0.26% to the case value of approximately 0.85%. This increase results in a subsequent increase in hardness and wear resistance. It is believed that, for unalloyed medium carbon steels, the desired properties of combined case hardness and toughness may be obtained by carburizing to reach an eutestoid composition through the case of link 18. Tempering the martensite causes its crystal structure to gradually change from body-centered tetragonal to body-centered cubic as the tempering temperature increases to reach the combined desired properties of hardness and toughness of link 18.

The carburized case can also contain small amounts of bainite, of cementite, or of a fine pearlite. The core can also contain small amounts of fine pearlite.

By employing links 18 an improved tire chain 10 which has approximately twice the durability of a conventional chain is obtained.

It should be understood that various modifications, changes and variations may be made in the arrangement, operation, and details of construction of the elements and the processes disclosed herein without departing from the spirit and scope of this invention.

We claim:

1. An improved tire chain including a pair of side members, each side member having a first and second end in releasable securement to each other by fastening means, and a plurality of cross chains each cross chain having a plurality of links and being secured at a first end to one of said side members and being secured at a second end to the other of said side members, said cross chains extending between said side members at preselected intervals to abut a circumferential surface of a tire upon which tire chain is to be mounted, wherein the improvement comprises:

employing a medium carbon steel wire to fabricate cross chain links which abut the circumferential tire surface, the cross chain link steel comprising of about 0.22-0.28 percent by weight of C, about 0.60-0.90 percent by weight of Mn, up to about 0.04 percent by weight of P, up to about 0.05 percent by weight of S and the balance substantially iron, each cross chain link having a carburized surface layer of a depth of about 1/7 to about 1/18 of the diameter of said link, so that said carburized layer has a surface hardness of Rockwell C49 to about Rockwell C57, but said link having a link core hardness of about Rockwell C32 to 40;

said cross chain links being fromed in a process including: preparing a generally tapered first end on a length of wire stock;

bending the wire stock into a twisted generally oval link interlaced with a last earlier formed open link;

severing the oval link from the wire stock to form a generally tapered second end abutting the first tapered end of the oval link; and welding the abutting tapered ends of the open link to permanently close the link.

2. An improved tire chain as defined in claim 1 wherein said cross chain links are heat treated in a process comprising:

case hardening said cross chain links at a temperature of about 1750° F. in a gaseous atmosphere having a carbon potential of approximately 0.90-1.5 percent, by weight;

quenching said cross chain links in a liquid medium until the links approach ambient temperatures;

tempering said cross chain links at a temperature of about 450° F.; and air cooling said cross chain links to ambient temperature.

3. An improved tire chain as defined in claim 1 wherein said cross chain links are heat treated after forming in a process comprising:

case hardening said cross chain links at a temperature of about 1750° F. for a period of about one hour in an atmosphere which provides a carbon concentration of approximately 0.75-0.90 percent by weight in the carburized case of the chain link;

quenching said cross chain links in water until said links approach ambient temperature;

tempering said cross chain links at a temperature of about 450° F.; and air cooling said cross chain links to ambient temperature after the tempering.

* * * * *